Patented Mar. 8, 1938

2,110,184

UNITED STATES PATENT OFFICE 2,110,184

PROCESS FOR PUFFING AND DEHYDRATING FRUIT

Wells A. Webb, Wilmington, Calif., assignor to Dry Fruit Products Company, Oakland, Calif., a corporation of California No Drawing. Application January 2, 1936, Serial No. 57,259

5 Claims. (Cl. 99—204)

The invention relates to processes for drying or dehydrating fruit and other food products, and more particularly to the processes disclosed in the patents to Charles C. Moore, No. 1,543,948 and 2,023,536 issued June 30, 1925, and December 10, 1935, respectively.

An object of the present invention is to provide a process of the character described by which fruit and other food products may be puffed or swelled to the well rounded appearance of their fresh state and, while being reduced to a dry, porous, crystalline structure, retain the pleasing original flavor of the fruit or other food product.

Another object of the invention is to provide a new and delicious puffed fruit or food product.

The invention possesses other objects which with the foregoing will be set forth in the following description of the preferred forms of the invention. It is to be understood, however, that I do not limit myself to said description, as I may adopt variations from said forms within the scope of the invention as set forth in the claims.

As disclosed in the Moore patents above referred to it is possible, by treating ordinary commercially dried fruit under proper conditions of temperature and pressure, to reduce the fruit to its essential fruit fibre, tissues, mineral matter and fruit sugar or fructose, without causing any substantial decomposition of the fruit sugar. This dehydration is made possible by the drying of the fruit in a reduced pressure so as to lower the boiling or vapor point of the moisture to a temperature where the fruit may be safely dehydrated without chemical change or decomposition of the fruit sugar. When the fruit is properly dried by this method, a hard, crunchy, crystalline structure may be produced and which is a most tasty and delicate food substance which may be consumed in wafer, cake or in ground form.

It has been the practice in dehydrating fruits by the above process to initially grind the fruit into finely comminuted particles so as to allow for a more uniform and better penetration and absorption of heat during the drying of the fruit. By the process of the present invention, however, somewhat larger or even whole pieces of fruit may be dehydrated and the fruit puffed to retain substantially its original shape and at the same time reduced to a porous crystalline structure practically identical with the product produced by the finely comminuted fruit particles.

When the fruit is first placed in the drying chambers under the presence of heat and reduced pressure, a relatively large initial vaporization of water takes place. This rather rapid rate of volatilization continues until substantially all the free water in the fruit has been evaporated, leaving only a very small moisture content but one which must be substantially completely removed before the fruit is reduced to a dry crystalline structure. There are therefore two major rates of moisture vaporization during the dehydrating process, the first being the rather high initial rate of volatilization, and the second the prolonged slow rate of volatilization. I have found that after the initial drying period, and during the second mentioned drying period, a momentary increase of pressure in the drying chamber followed by a sudden reduction of pressure and a restoration of the former drying condition, will effect a puffing of the fruit being dried. It is necessary that the moisture in the fruit should be reduced to a point prior to the momentary change of pressure where the heat absorbed by the fruit under the pressure condition will effect, on the sudden reduction of pressure, rapid and substantially complete vaporization of the moisture and cause a puffing of the fruit. On the other hand, it is necessary that the moisture be initially reduced to a point where the amount of heat absorbed during the pressure condition for causing the aforesaid rapid vaporization will not produce an increase of temperature sufficient to cause any substantial chemical change or decomposition of the fruit sugar.

By way of example, the fruit or other food product to be dehydrated is placed in a drying chamber provided with heaters producing a temperature of up to 300 or 320 degrees F. and the chamber evacuated to a vacuum of about 29.5 inches of mercury. The initial drying period before mentioned will of course vary with different types of fruit or food. In the case of such food products as raisins, apples, bananas and peaches, this initial period will extend twenty to thirty minutes and the fruit will have by this time reached from 180 to approximately 200 degrees F. At this time the valve to the evacuating pump is closed and steam or other gas or fluid is admitted at such a rate that the pressure in the chamber will be raised to approximately thirty to forty-five pounds per square inch in about one to three minutes. The chamber is then rapidly evacuated to cause a restoration of the low pressure condition in about one minute. The withdrawal of the steam or other pressure fluid from the chamber should be constant so that no major increase of pressure may be effected which might in turn cause deflation of the fruit. The fruit is thereafter maintained at approximately 180 to 190 degrees F. until the product has reached a dry crystalline state. This will vary for different fruits from about one half to one hour. When the fruit has reached this substantially dry state, the temperature of the chamber is rapidly reduced to crystallize the sugar, causing the fruit to harden. When the temperature of the fruit has decreased to approximately 100 to 125 degrees F., air is very slowly admitted to the chamber to gradually restore atmospheric pressure. This final cooling and slow raising of pressure is essentially to prevent a collapse of the fragile porous fruit structure.

Banana slices may be specially treated to give them a novel appearance, by prolonging the pressure condition for two or three minutes at approximately thirty-five pounds pressure. The banana slices, when thereafter removed from the chamber, will be beautifully laced with fine red lines which form patterns across the face of the slices. This lacing effect is most pronounced with very ripe bananas.

I claim:

1. The process of puffing and dehydrating fruit which consists in drying the fruit in the presence of heat and reduced pressure to evaporate the free moisture, then subjecting the fruit to a sudden increase of pressure followed by a restoration of reduced pressure until the fruit is substantially completely dry.

2. In the process of drying fruit which involves the subjection of the fruit to a reduced pressure, the rapid heating of the fruit to evaporate the free moisture, and then the slower heating of the fruit to effect a substantially complete dehydration thereof, that step in the process which consists in subjecting the fruit to a momentary increase in pressure during said second mentioned heating period.

3. The process of puffing and dehydrating fruit which consists in initially partially drying the fruit, then subjecting the fruit to a sudden decrease of pressure, and completing the drying process at a reduced pressure until the fruit reaches a substantially dry crystalline state.

4. The process of puffing and dehydrating a food which consists in partially drying the food, then subjecting the food to a rapid decrease in pressure, continuing the drying in the presence of heat and at a reduced pressure until a substantially dry crystalline state is reached, thereafter reducing the temperature of the food, and then gradually restoring normal pressure conditions.

5. The process of puffing and dehydrating food which consists in partially drying the food in the presence of heat and reduced pressure, subjecting the food to a momentary increase in pressure followed by a sudden decrease in pressure, and the maintenance of a reduced pressure until the food is substantially completely dry, the moisture content of the food prior to said increase of pressure being reduced to a point where the heat absorbed by the food under said pressure will effect on said sudden decrease of pressure for a rapid vaporization of the moisture causing a puffing of the food, and said moisture content prior to said increase in pressure being reduced to a degree requiring an absorption of an amount of heat, for said vaporization, insufficient to cause any substantial decomposition of food sugars.

WELLS A. WEBB.